United States Patent
Kwok et al.

(10) Patent No.: US 11,328,032 B1
(45) Date of Patent: May 10, 2022

(54) SYSTEMS AND METHODS FOR PRESENTING A DEMO FOR ENABLING A VISUAL DIALOGUE WITH A CUSTOMER BY SINGLE USER TAP ACTIONS

(71) Applicant: salesforce.com, inc., San Francisco, CA (US)

(72) Inventors: Mathew Kwok, San Francisco, CA (US); Helder Rocha, West Chester, PA (US); Timothy Witzenman, Indianapolis, IN (US); Lucinda Waysack, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/247,738

(22) Filed: Dec. 21, 2020

(51) Int. Cl.
| | | |
|---|---|---|
| *G06F 16/955* | (2019.01) | |
| *G06F 3/01* | (2006.01) | |
| *G06F 3/04886* | (2022.01) | |
| *G06F 3/04817* | (2022.01) | |
| *G06F 16/957* | (2019.01) | |

(52) U.S. Cl.
CPC .......... *G06F 16/9558* (2019.01); *G06F 3/017* (2013.01); *G06F 3/04817* (2013.01); *G06F 3/04886* (2013.01); *G06F 16/9574* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Mandrita Brahmachari
(74) *Attorney, Agent, or Firm* — LKGlobal | Lorenz & Kopf, LLP

(57) ABSTRACT

Methods and systems for building a demo to interact with a customer including causing to display by a processor, a link for accessing the demo; initiating, by the processor, the demo by actuation of the link wherein the demo includes a set of webpage images, each configured as a screen with animations to mimic an interaction between a user and the customer; and presenting, by the processor, a storyboard of a dialog composed of a set of screens mimicking an ongoing customer dialogue for a service wherein the set of screens includes a first subset of webpage images of a customer view and the second subset of webpage images of a backend analytical view that are configured with animation to build on the ongoing customer dialogue based on mimicked data received from a suite of customer apps to enable the demo to have an appearance of actual customer exchange.

18 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,851,104 B1* | 2/2005 | Rodrigues da Silva .. G06F 8/36 717/104 |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,905,763 B1* | 12/2014 | Hu .......................... G09B 25/00 434/365 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0248527 A1* | 11/2006 | Jaeckel ............... G06F 9/45537 718/1 |
| 2007/0218448 A1* | 9/2007 | Harmeyer ............... G09B 5/00 434/350 |
| 2008/0034037 A1* | 2/2008 | Ciudad ................. G06Q 10/10 709/204 |
| 2008/0122796 A1* | 5/2008 | Jobs ..................... G06F 3/04883 345/173 |
| 2008/0249972 A1 | 10/2008 | Dillon |
| 2009/0007017 A1* | 1/2009 | Anzures ............... G06F 3/0482 715/835 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0122063 A1* | 5/2011 | Perlman ............... H04N 21/422 345/161 |
| 2011/0164143 A1* | 7/2011 | Shintani ............. H04N 21/4223 348/222.1 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

| | | | |
|---|---|---|---|
| 2016/0224320 A1* | 8/2016 | Jemiolo | G06Q 50/01 |
| 2018/0039502 A1* | 2/2018 | Singh | G06F 40/263 |
| 2019/0371192 A1* | 12/2019 | Chandra | G06F 16/743 |
| 2020/0034874 A1* | 1/2020 | Narayan | G06Q 30/0277 |
| 2020/0160842 A1* | 5/2020 | Lin | G06F 3/167 |
| 2021/0150127 A1* | 5/2021 | McCulloh | G06N 3/0454 |

* cited by examiner

US 11,328,032 B1

SYSTEMS AND METHODS FOR PRESENTING A DEMO FOR ENABLING A VISUAL DIALOGUE WITH A CUSTOMER BY SINGLE USER TAP ACTIONS

TECHNICAL FIELD

Embodiments of the subject matter described herein relate generally to demo systems, and more particularly, to methods and systems for presenting a demo of a visual dialog of interaction between clients or customers on a mobile device initiated by a single tap action.

BACKGROUND

An organization typically obtains information about potential clients or customers in order to develop marketing strategies. In the past, to perform a demo on many products, a demo presenter would need to install multiple apps, visit many different web pages, and set up a multitude of dummy data such as emails, text images, and social posts.

In some instances, the information is stored in a database that is not available without permission. In some instances, the information is available but not organized in a manner that is beneficial for marketing analysis.

Accordingly, it would be desirable to provide improved systems and methods that present a demo of an ongoing customer dialogue in a storyboard of customer views and corresponding backend views that describe with animation a user and customer exchange about a product or service by visiting an URL one URL and adding it to the home screen of a mobile device.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
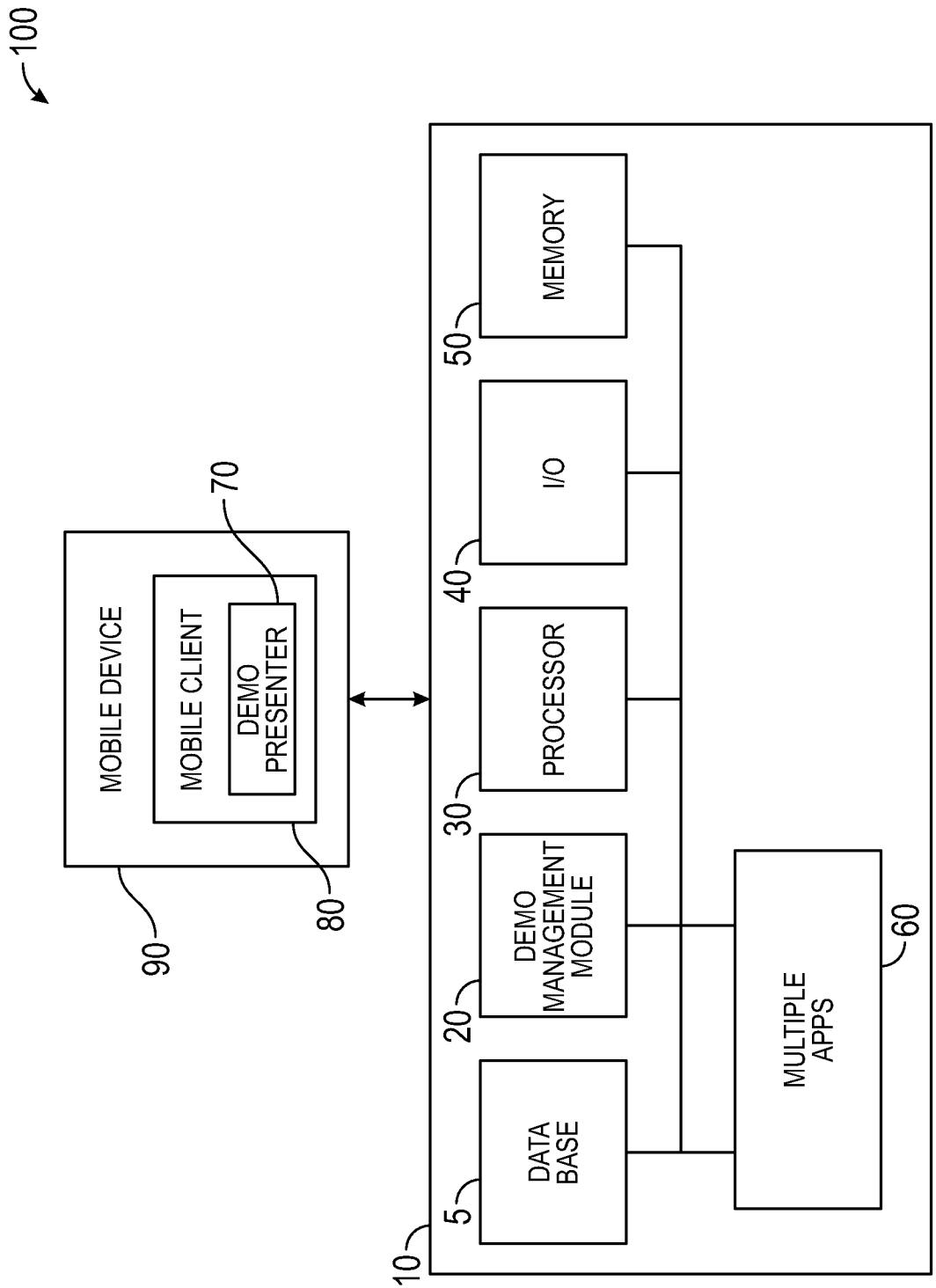
FIG. 1 is a block diagram illustrating the demo presenter management system according to some example implementations.

The following description describes embodiments of a demo that can be implemented on a mobile device by a demo presenter app that provides an "all-in-one" web-based application of a demo that can mimic the behavior of multiple apps on presented demo webpages without having to actually access the multiple apps. The demo app displays and switches between app (ex. iOS apps) in a browser using HTML, CSS, and JS, providing the look and feel of using a smartphone (ex. iPHONE® or the like) via a smartphone bezel (iPHONE® bezel) display within the browser. The demo can be controlled by similar gestures that ordinarily enable control on a desktop device. The demo uses prebuilt animation features integrated into each webpage to mimic the behavior of the multiple apps.

Additionally, in one implementation of the demo presenter disclosed herein are systems and methods for receiving a link on a mobile device (or personal device client) for accessing the demo to present to a user. The systems and methods include initiating the demo by a single tap actuation of the received link by the user. The demo includes a set or sequence of webpages in a browser to enable interaction between the user and a customer. Further, the systems and methods include generating a storyboard of a dialog composed of a sequence of screens in a smartphone bezel containing app webpages with animation mimicking a set of customer apps implemented for customer interaction coupled to a mirrored sequence of screens. The mirrored sequence of screens are a corresponding alternative sequence of app webpages containing backend visualizations of the customer apps. The backend visualizations can include customer profile information, customer transactional information, etc.

More particularly, the subject matter described herein discloses systems and methods for presenting interactions via the animation configured on each webpage in the demo in a storyboard layout for convenient presentation to the customer.

The subject matter described herein further discloses apparatus, systems, techniques, and articles for building the demo of the storyboard of presenting multiple app interactions between the user and the customer in an all-in-one application.

One or more parts of the above implementations may include software. Software is a general term whose meaning can range from part of the code and/or metadata of a single computer program to the entirety of multiple programs. A computer program (also referred to as a program) contains code and optionally data. Code (sometimes referred to as computer program code or program code) contains software instructions (also referred to as instructions). Instructions may be executed by hardware to perform operations. Executing software includes executing code, which includes executing instructions. The execution of a program to perform a task involves executing some or all of the instructions in that program.

The mobile or electronic device (also referred to as a personal device, device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid-state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long-term storage and main memory, and thus the electronic device may have no or only a small amount of volatile memory for main memory.

In addition to storing code and/or data on machine-readable storage media, typical devices (e.g., mobile or electronic devices) can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that, when executed, cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Turning now to the figures, the demo management system 10 is shown and described in accordance with various embodiments. With particular reference to FIG. 1, in various embodiments, the exemplary demo management module 20 may be implemented in the context of a computing environment 100. The computing environment 100 operates with any sort of conventional processing hardware (i.e., for the demo management system 10), such as a processor 30, memory 50, input/output features 40, database 5, multiple apps 60, and the like.

The input/output features 40 generally represent the interface(s) to networks (e.g., to a network, or any other local area, wide area, or another network), mass storage, display devices, data entry devices, and/or the like.

The processor 30 may be implemented using any suitable processing system, such as one or more processors, controllers, microprocessors, microcontrollers, processing cores, and/or other computing resources spread across any number of distributed or integrated systems, including any number of "cloud-based" or other virtual systems.

The memory 50 represents any non-transitory short or long term storage or other computer-readable media capable of storing programming instructions for execution on the processor 30, including any sort of random access memory (RAM), read only memory (ROM), flash memory, magnetic or optical mass storage, and/or the like. The computer-executable programming instructions, when read and executed by the processor 30, cause the processor 30 to create, generate or otherwise facilitate tasks, operations, functions, and/or processes described herein. It should be noted that the memory 50 represents one suitable implementation of such computer-readable media, and alternatively or additionally, the processor 30 could receive and cooperate with external computer-readable media that is realized as a portable or mobile component or application platform, e.g., a portable hard drive, a USB flash drive, an optical disc, or the like.

The processor 30 implements an all-in-one web-based application (demo presenter app 70) via the client 80 hosted on a mobile device 90. The mobile device 90 can be considered a smartphone, iPAD®, or like device. The demo presenter app 70 is configured to mimics the behavior of multiple apps (or suite of apps) 60.

For example, the multiple apps include the commerce app, the analytics app, and marketing apps. The multi-app demo that is configured by the demo presenter app 70 can be displayed in a smartphone-like bezel (i.e., iPHONE® bezel) for display on the client 80.

The client 80 can be configured as a browser to display webpages with built-in animation. The mobile device 90 (i.e., iPHONE® webpage display) is controlled by gestures as described in FIGS. 2-4. Each webpage is configured with prebuilt animation and touch controls that are responsive in different parts of the webpage (or virtual smartphone bezel screen) to different user gestures. The webpages are in a layout that forms a storyboard, and the user can navigate the storyboard with a simple set of gestures during the presentation of the demo. The demo presenter (or demo presenter app) 70 is an app that enables the user to navigate through a series of displays as configured by the demo management module 20 and implemented by instructions to the processor 30. In an exemplary embodiment, the demo presenter 70 displays and switches between various iOS apps in the browser (client 80) using prebuilt instructional code in HTML, CSS, and JS. The demo presenter 70 is configured with prebuilt animation to present the look and feel in the webpage in the browser (client 80) of an interaction a user and customer would experience using an interface displayed on an iPHONE® type bezel with native iOS® animations. Hence, even though the demo presenter 70 displays a web-based application, in client 80, the user and customer both have a similar user experience as using the interface associated with the multiple apps 60 of the actual system.

In an exemplary embodiment, the demo presenter 70 can configure screens that provide SALESFORCE 360® products with a range of SALESFORCE® apps associated with customer products. The demo presenter 70 mimics in the browser (client 80), a single view experience of front end visuals and backend analytics of the customer's connected app, data source, or device across the customer's cloud service premises server. In other words, the demo presenter 70 is configured in the various webpages in the smartphone browser to present prebuilt animated features of the customer's full suite of business software products that are desired to be shown in the demo. The demo presenter 70, similar to the SALESFORCE 360® platform, integrates seamlessly via the demo management module 20, a centralized platform in the browser (client 80) by a storyboard of all the customer products and operational processes that are desired in the demo. The demo presenter 70 presents a demo that is a virtual all in one platform integrated into the browser inside an iPhone or other smartphone bezel.

The demo presenter 70 via the configuration tools and code of the demo management module 20 is responsive to different mobile device 90 screen sizes. In an exemplary embodiment, if the user visits the URL on a desktop device or another electronic device, the display of the webpage in the browser can accordingly resize and display the same or similar demo inside of an iPHONE® type bezel within the browser. The demo can be controlled with the same or similar set of gestures by the user on the desktop device or other electronic device using a mouse or with keypresses on the keyboard (via the I/O 40).

In an exemplary embodiment, various open-source animation tools such as BLENDER®, K-3D®, can be programmed and stored in memory 50 to create prebuilt animations in webpages to mimic the operation of user interfaces of the multiple apps 60 that is displayed by the demo presenter 70. For example, in exemplary embodiments, prebuilt animations in webpages can put forth techniques such as modeling, rigging, animation, simulation, rendering, compositing, and motion tracking, etc. that are used to mimic the user interfaces and customer experience of the multiple apps 60 in the demo presented without actually implementing the multiple apps 60.

In an exemplary embodiment, the animations can be created or prebuilt using the SALESFORCE® LIGHTENING components on the SALESFORCE 360® platform by creating a CSS file and implementing on the webpage static and dynamic resources, keyframes, conditional rendering, etc. animation tools by a programmer to mimic the user interface experience by the customer of each customer service app that is used.

In the exemplary embodiment, additional "fake" or "virtual" apps can be prebuilt that mimic via animation the actual apps or suite of apps of customer cloud in use. For example, INSTAGRAM®, SNAPCHAT® or other custom apps can be configured. It is contemplated that a variety of different applications can be generated, and the number is open-ended as desired. Additionally, in an exemplary embodiment, it is contemplated to abstract out of the structure of the app from customer records that are currently in use and which the SALESFORCE® database 5, records and stores so that all available user interfaces for a demo are customized and made available to the user with the demo presenter 70 in an easy to use point and click interface implemented by the demo management module 20.

In various exemplary embodiments, the demo management module 20 is shown to communicate with the database 5 system, a mobile device 90, personal devices 26, and/or memory 50 for presenting the demo containing one or more interfaces displayed in various webpages in the client 80. In various embodiments, stored customer demos can be retrieved from the database 5. In various embodiments, a mobile display includes a display screen configured in the form of a bezel of the various mobile devices in the demo that includes an APPLE® iPHONE®, iOS® display, GOOGLE® ANDROID® display, SNAPCHAT® user interface display, that is displayed in a set or sequence of webpages configured as screens in a storybook layout (in FIG. 2).

With reference now to FIGS. 2-4 and FIGS. 5A, 5B and with continued reference to FIG. 1, diagrams illustrate various use case workflows of the demo management system 10 for interacting with a customer to create customer interfaces and backend visualizations.

In accordance with an exemplary use case workflow for creating a demo, the demo presenter 70 would present a storyboard 200 of a set of visuals 210 of webpages. The webpages are composed of pairs of a front end screen 80-1, 80-2, . . . 80-*n*, and a corresponding backend screen 85-1, 85-2 . . . 85-*n*. In an exemplary embodiment, each set or pair 220 of front end screen 80-1 and backend screen 85-1 in the set of visuals 210 of the storyboard make up a layout of the storyboard 200 in the demo presented by the demo presenter 70.

In the exemplary embodiment, The following table described below is just one example of how a user can speak in a demo. The talk track is a script made in the user's own words.

In the exemplary embodiment, the demo character's name that is displayed is "Taylor Smith" to articulate the story on a storyboard. In the exemplary embodiment, the multiple apps include various SALESFORCE® products featured in the demo talk track of a Commerce Cloud (i.e., with SALESFORCE® EINSTEIN™ Predictive Sort), Marketing Cloud (Ads, Interactive Email), Service Cloud (EINSTEIN™ Chatbot), Platform (Apps), and SALESFORCE® CUSTOMER 360® Truth Profile (a visualization). The demo includes the talk track that is tied to each pair 220. The exemplary talk track with a storyboard of webpages is described below:

| Talk Track | Visual Storyboard Demo presented |
|---|---|
| Meet Talyor.<br>With shelter in place, Taylor has been spending more time exercising, and her current pair of running shoes aren't cutting it. She's been admiring the latest SNEAKER COMPANY sneakers her friend has | Introduction- No Webpages shown |
| As to be expected, it starts with very little data; in fact, Taylor isn't known to SNEAKER COMPANY yet and is labeled "anonymous" here, however with IP tracking, they can gather that this customer is currently in San Francisco, and most importantly, even though SNEAKER COMPANY doesn't know who this customer is yet, they'll still be able to personalize the anonymous customer's journey!) | Pair of Webpages 80-1 and 85-1 displayed in an iPHONE ® bezel, user can flip back and forth between each corresponding displayed webpage using a button configured on the screen (See FIG. 3) |
| . . . and she starts browsing the nicely designed, mobile-friendly SNEAKER COMPANY.com site (built on an eCommerce Cloud platform) | Another Pair of webpages 85-1 and 85-2 displayed a mobile-friendly STORE.COM site |
| While SNEAKER COMPANY may not know Taylor's name, they are able to collect information about her site visit to help them personalize the experience, such as the pages she's viewing, her location | Backend webpage visual 85-n displays updated analytics about her visit that is shown in the demo |
| Her friend has texted an article about the cuteness of puppies, and she taps through to read the article, but all is not lost for SNEAKER COMPANY. | The demo provides realistic texting in animation on the iPhone bezel |
| Even with limited information about Taylor, SNEAKER COMPANY is still able to target her with a relevant ad powered by exemplary SALESFORCE ® (DMP/CDP/Audiences). And this isn't just any SNEAKER COMPANY ad; it's personalized for Taylor and encourages her back to the site by showing her running shoes she was browsing moments ago. | (Optional SALESFORCE ® C360 Script: All throughout this demo, we'll flip to see this visualization of the customer's 360 Truth Profile being built out as Taylor interacts with SNEAKER COMPANY along the journey to personalize the anonymous customer's journey!) |
| When she taps on the ad, she isn't taken to the SNEAKER COMPANY homepage, where she'll have to search and fumble to find the same shoes she just saw in the ad. Instead, she's taken to the tailored, mobile-friendly section of SNEAKER COMPANY.com featuring the (Ultraboost) running shoes from the ad, right at the top of the page, thanks to Einstein Predictive Sort, which prioritizes the most likely products for each customer. What's happening behind the scenes is the power of Customer 360. Our Marketing and Commerce technologies are connected and sharing data. This, combined with artificial intelligence or Einstein as we call it, enables SNEAKER COMPANY to deliver a relevant ad to an anonymous customer, removing the friction from finding and purchasing the perfect pair of shoes for Taylor. | Backend visuals are continuously built and displayed in the demo in the pair of webpages so user and customer can visually assess the added information in the storyboard |
| (With SALESFORCE ® Commerce,) SNEAKER COMPANY makes it easy for customers to use which payment they'd like to use (options: checkout with a credit card, PayPal, or Apple Pay). Taylor chooses Apple Pay (and before she gets distracted by any other cute puppy photos.) . . . | |
| (Optional C360 Script: The Truth Profile builds . . . a product has been added to her bag.) | |
| But a few minutes later, she realizes she should have ordered a 1/2 size larger. | |

| Talk Track | Visual Storyboard Demo presented |
|---|---|
| Luckily, SNEAKER COMPANY makes it easy to get in contact with them, and powered by Salesforce; it is able to offer customer service across any channel like Chat, Email, Phone, and text. (Optional C360 Script: Now, let's take a look at the Truth Profile . . . Wow, the profile information has flooded in. Thanks to SALESFORCE ® Customer 360 Audiences and Data Manager, all the known and unknown data of this customer has now been consolidated into ONE unique person, and Single Source of Truth ID (SSOT) for who we now know is "Taylor Smith." | |
| What just happened here is when Taylor's email address was submitted during payment, that was the key piece of information for Salesforce to tie all the data points together into this consolidated view for Taylor. You see, Taylor may have interacted with SNEAKER COMPANY in other ways leading up to this and maybe even with different contact info such as Taylor P. Smith or another email address like taylorsmith72@YAHOO.COM, but now all those instances of "Taylor" from across the SNEAKER COMPANY Marketing Cloud, Commerce, and Service Orgs are consolidated into this one record of Taylor Smith. BUT what's even more impactful is that since SNEAKER COMPANY has this SSOT of Taylor, now all the systems (marketing, commerce, service) can all use this one SSOT to personalize the customer journey for Taylor. In short, the siloed data for the known and unknown Taylor Smiths across the SALESFORCE ® systems have been consolidated into this one SSOT, and now all those systems have a clear view of Taylor Smith to personal the journey for Taylor -- all thanks to SALESFORCE ® Customer 360) | |
| Right away in the Chat, Taylor is greeted by adiBot, which is Salesforce's chatbot technology powered with the natural language processing of SALESFORCE EINSTEIN ® and Service Cloud | |
| Taylor asks if she can change the size of the shoes | |
| Because our Service technology is connected to Marketing and Commerce, Taylor doesn't have to plug in a confirmation number. All she has to do is confirm with a tap that the bot has found the order she'd like to change. | |
| The bot displays a picklist of different shoe sizes. Thanks to the intelligence of Einstein Bots, simple routine tasks can be easily handled as easily as this. (Optional C360 Script: Truth Profile stays still with open case activity in progress.) | |
| The bot lets her know it will email her a survey, so she can share more feedback about her experience. (Optional C360 Script: Truth Profile stays still with open case activity in progress.) Drive Note: Tap anywhere to display the Email Notification. She receives a new email from SNEAKER COMPANY and taps through to read it . . . (Optional C360 Script: The Truth Profile now reflects the case being closed.) | Backend visual reflect case closed |

Figure 2:
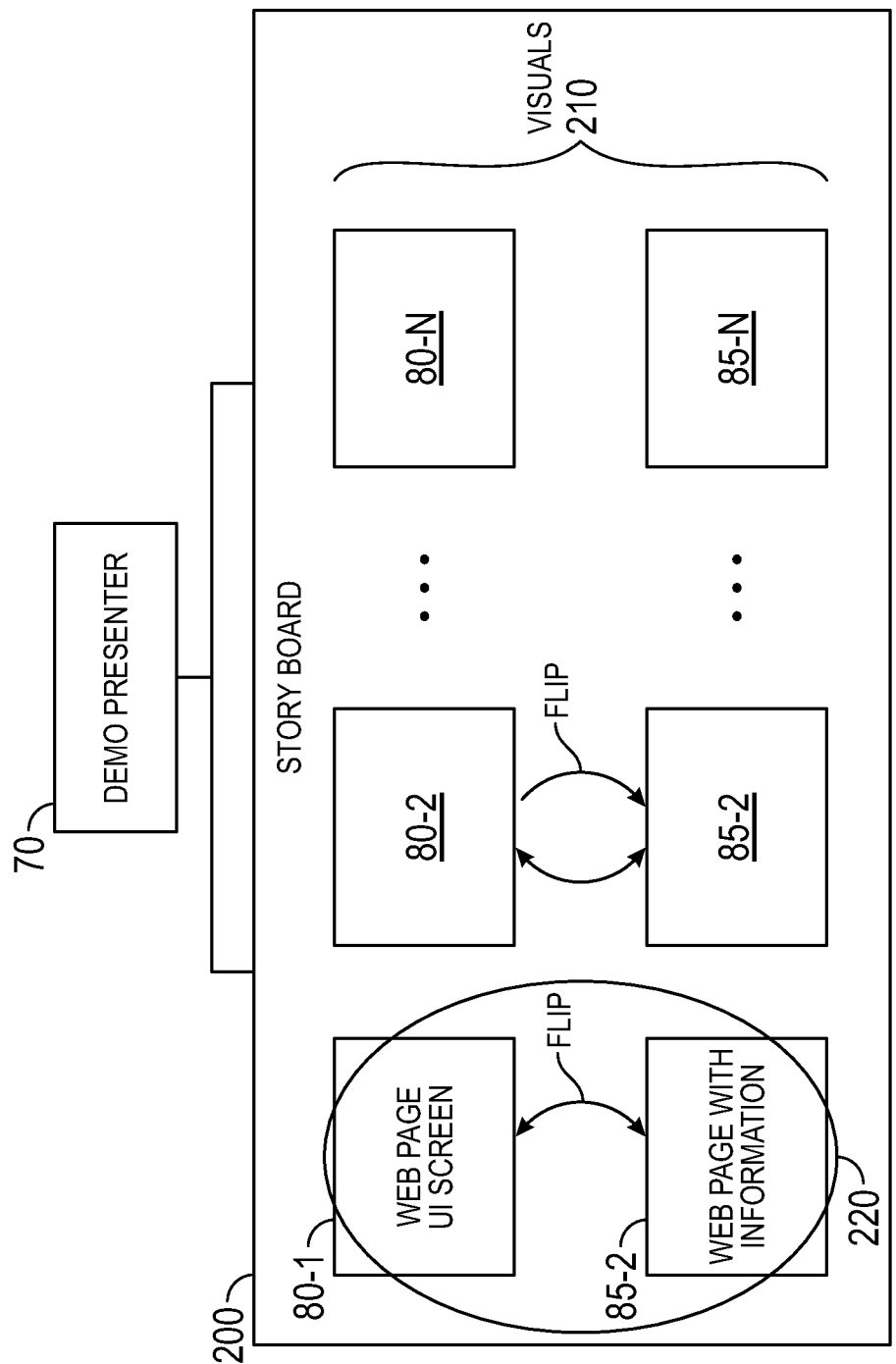
FIG. 2 is a more detailed block diagram illustrating demo presenter storybook layout according to some example implementations.

In FIG. 2, a user dialog with visuals is presented in the demo, in each pair 220 of webpages that are updated as the various app of the customer service apps learn more about the customer. The visuals 210 in the storyboard 200 shown in a demo the customer interaction, and the webpages with animation are built to show data added, and information gathers intuitively via machine learning and interaction in a customer session about the client without the client actually offering or entering the information. In other words, the demo in a series of webpages lays out how multiple apps are used to create the customer experience across the cloud apps that each provide different functionalities and add to the knowledge that is built during the interactive session.

The demo management module 20 interacts with the database 5, and multiple apps 60 to build data fetched across the cloud as it builds the backend visual webpages.

Figure 3:
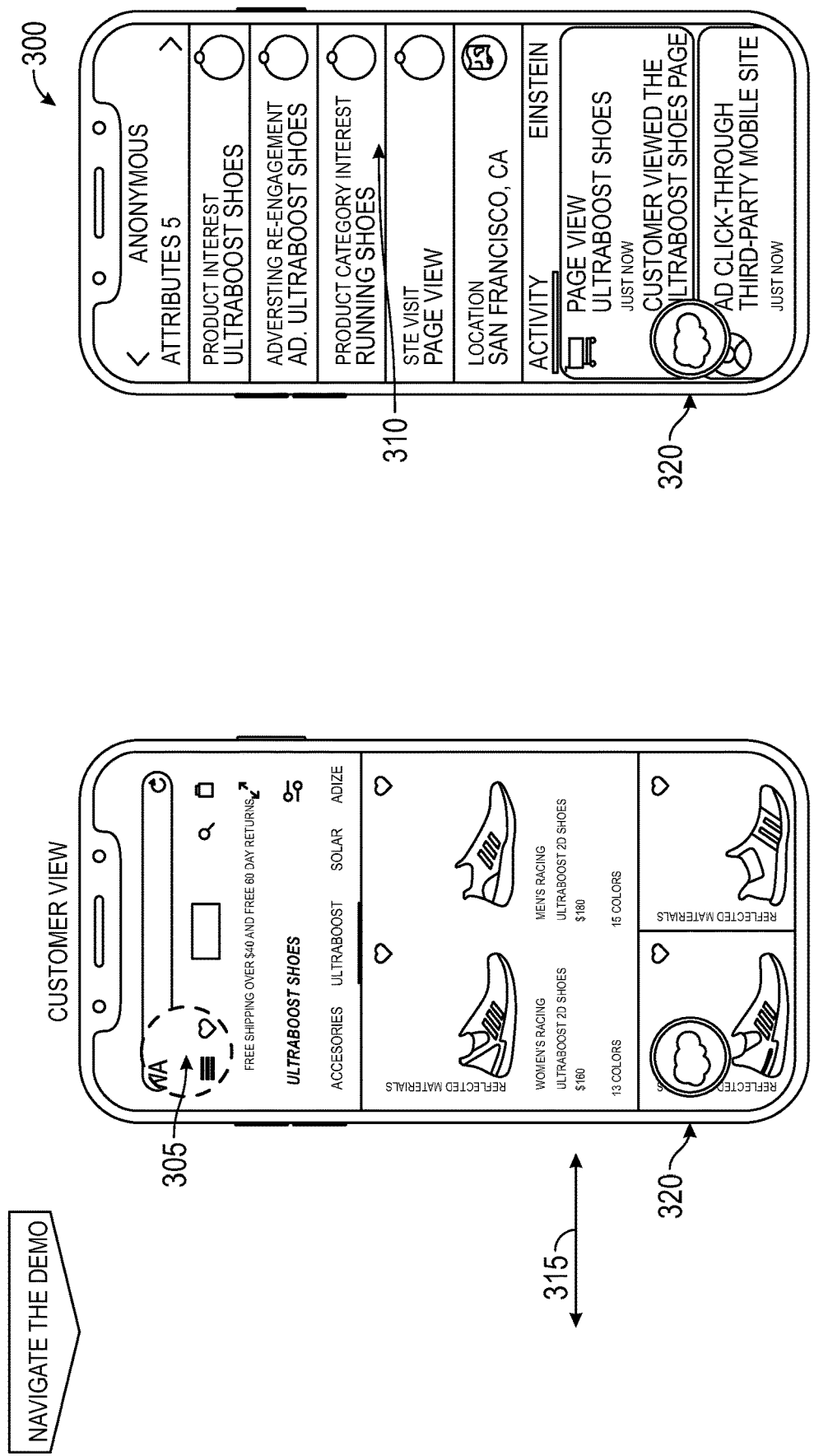
FIG. 3 is a more detailed diagram illustrating a webpage displayed of the demo management system according to some example implementations.

FIG. 3 is an exemplary pair of webpages configured with gesture controls to navigate the storyboard of the demo management service in accordance with various embodiments. In an exemplary embodiment, to begin the demo (i.e., the demo on tap), the user would tap an icon on the client of the mobile device or voice a "hello" type of command to a welcome screen and tap the start demo icon. To navigate, the user would view the presented screens 300 in either the customer view of the webpage or the backend visual view of the webpage. The user may view the demo storyboard to see where a user should tap to make the demo look even more real (i.e., compared to just tapping in the same spot for each screen to advance the demo). For example, at location 310, the user would tap to "Go forward one screen=Tap anywhere on the screen (*except for the top left or bottom left corners)." Although, in this case, the user can tap anywhere to advance the demo, it is generally recommended to tapping on the appropriate areas on each screen to make the demo even more real to your audience (e.g., tap on the proper shoe size). To navigate in the backward direction, the user to "Go Back one screen=Taps on the top left corner (hidden button)." As a caution to the user, the webpages are configured that if the user taps on the left side of notifications on two particular key screens in the demo, which are the SMS Notification and the Mail Notification screens, the tapping, in this case, is indicative of backward navigation (i.e., tapping the back button). In this case, instead, the user should tap anywhere to the right on the notification or anywhere else on the screen.

Next, for the user to flip the webpage view, the user should tap the icon at location 320; this enables the user to flip between the customer view and the backend visual view. In an exemplary embodiment, the flip icon is the SALESFORCE® C360 logo in the bottom left corner. The user can scroll vertically, but tapping on the backend visual screens will not cause any movement by design. That is, the backend visual webpage is kept in a static position. To flip back to the front view of the webpage or the customer, the user taps the location 320 or, in the exemplary embodiment, the SALESFORCE® logo icon.

The storyboard can be configured in chapters or sections (i.e., groups of webpages), and the user can jump to another demo chapter/section by swiping "Left" or "Right" (horizontally) anywhere in the middle of the screen (location 315). To restart the demo, for example, if the demo has reached the end, the user can tap the Reset Demo button (not shown) that is on the last screen. Upon tapping this button, the demo will proceed to the beginning, and the app is refreshed. If a hard reset is desired during the demo, then the user must force quit the app. In an exemplary embodiment, to force quit the app on an iPHONE® without a home button, swipe up and hold from the bottom of the iPHONE®, and then swipe up and away from the demo app. Then return to the iPHONE® home screen and tap the app again to open it. Finally, the user can tap (location 305) the top left corner to navigate via a hidden button back.

The demo management module 20 stores the customer screens in the database 5 or a separate configured customer database for use in the storyboard. The demo management system 10 mimics the communication with the multiple apps 60 to provide information to the user based on the customer screen.

Figure 4:
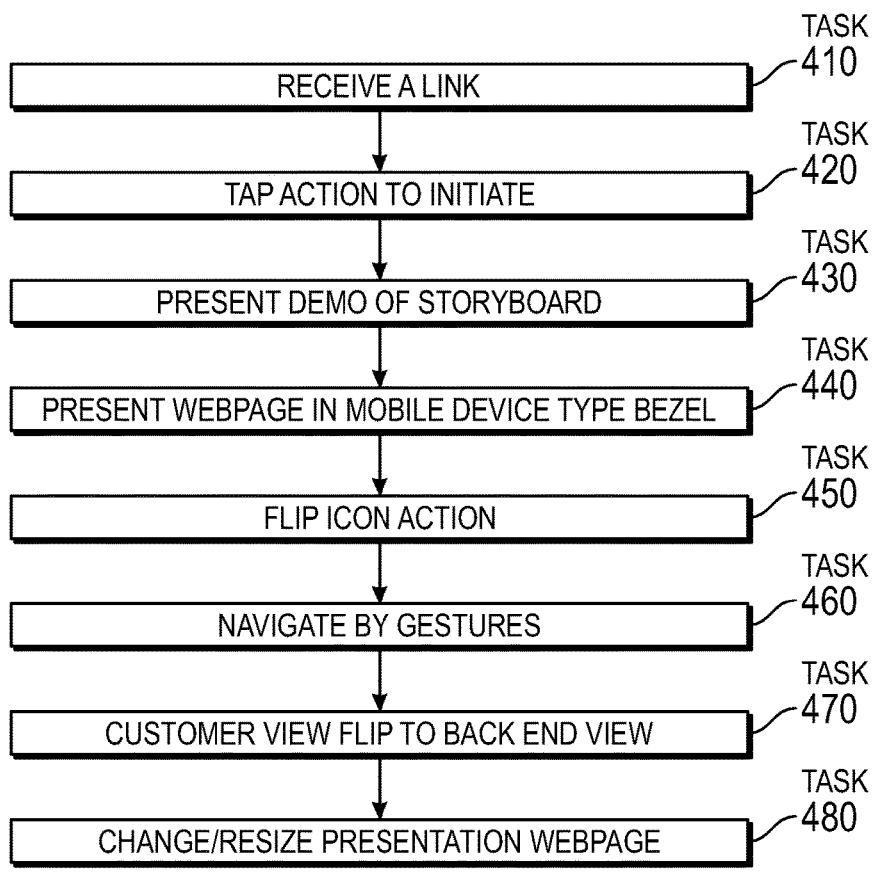
FIG. 4 is a flow diagram illustrating the demo presenter management system according to some example implementations.

In accordance with an exemplary workflow is illustrated in FIG. 4 of formulating and implementing a dialog with webpages of screens of a storyboard. The user of the demo management system 10, such as an engineer of the organization, interacts with the demo management module 20 via a mobile device 70. For example, at task 410 in FIG. 4, the user receives a link to initiate the demo of a set of screens that make up a storyboard to present via webpages in a mobile device type bezel view to the client. At task 420, upon receiving the link, the user, by a one-tap actuation, initiates the demo of the storyboard, which is presented in an all-in-one web-based application by the demo presenter app 70. The demo presenter app 70 is hosted on a client 80 by the mobile device 90.

At task 430, the demo as a storyboard is presented in a series of webpages that mimic screens. At task 440, the series of webpages are displayed with animation that mimics the customer view of the behavior of multiple apps 60. The multiple apps 60 (suite of customer apps) that are mimicked via screens displayed to the customer and corresponding backend visuals on alternate screens. For example, the multiple apps include the commerce app, the analytics app, and marketing apps. At task 440, the displayed webpage is configured like a display in a smartphone like bezel (i.e. iPHONE® bezel). At task 450, the user by tapping an flip icon on the customer screen or the backend visual screen, can flip the webpage view back and forth to toggle between either view. At task 460, the user can navigate on the webpage to mimic an action like the selection on an item for an eCommerce app or filling on a survey for an analytics app by a set of gestures. That is, the webpage displayed in the browser on the mobile device 90 (i.e., iPhone® webpage display) is integrated with a set of tap actuation gestures that allow for navigation in the storyboard screen layout. At task 470, the navigation upon tap actuation enables touch controls that allow for backward, forward, jumping, and scrolling actions of screens in the storyboard demo. In an exemplary embodiment, the screens provide SALESFORCE® 360® products with a range of SALESFORCE® apps associated with customer products.

At task 480, the demo presenter 70 via the configuration tools and code of the demo management module is responsive to different mobile device screen sizes. In an exemplary embodiment, if the user visits the URL on a desktop device or other electronic device, the display of the webpage in the browser can accordingly resize and display the same or similar demo inside of an iPHONE® type bezel within the browser. The demo can be controlled with the same or similar set of gestures by the user on the desktop device or other electronic device using a mouse or with keypresses on the keyboard (via the I/O).

In various exemplary embodiments, the demo management service provides A computer-implemented method for presenting a demo to a customer, and the method includes causing to display by a processor, a link for accessing the demo; initiating, by the processor, the demo by actuation of the link wherein the demo includes a set of webpage images, each configured as a screen with animation to mimic an interaction between a user and the customer; and presenting, by the processor, a storyboard of a dialog composed of a set of screens mimicking an ongoing customer dialogue for a service wherein the set of screens includes a first subset of webpage images of a customer view and the second subset of webpage images of a backend analytical view that are configured with animation to build on the ongoing customer dialogue based on mimicked data received from a suite of customer apps to enable the demo to have an appearance of actual customer exchange.

In response to a tapping action by the user of a button on the screen, flipping, by the processor, between screens of the app webpages and alternative webpages. In response to a tapping action by the user anywhere else on the screen, forwarding, by the processor, to a subsequent screen in the sequence of screens. Further, dividing, by the processor, the dialog into chapters in the storyboard, and in response to a swiping action, jumping, by the processor, to another chapter in the demo.

In various embodiments, the processor is configured to initiate the demo by a single tap actuation of the link by the user wherein the demo contains a set of webpage images, each configured as a screen with animations to mimic an interaction between the user and a customer. The processor presents a storyboard of a dialog composed of a set of screens mimicking a customer interaction for a service. The set of screens contains the first set of webpage images of a customer view and the second set of webpage images of backend analytical views that are configured with animation to build on an ongoing customer interaction based on mimicked data received from a suite of customer apps to enable the demo have an appearance of actual customer interaction. The processor is configured to switch screens in the dialog between the user and the customer based at least on a tap action to switch between the first and second set of screens. The processor is configured to mimic a set of behaviors of each customer app in the suite of customer apps by animation in a webpage displayed as the screen in the storyboard forming the dialog in the ongoing customer interaction and the configuring of a webpage with animation in a bezel display of a mobile device in the demo when presenting the storyboard of the dialog.

In response to a tap action by the user of a flip icon configured on the screen, the processor flips between the first and second set of screens during the storyboard of the dialog, and in response to a tap action by the user elsewhere on the screen other than at the flip icon, advancing, by the processor, to a next screen in the storyboard.

The processor divides the storyboard into chapters, and in response to a swipe action by the user on the screen, jumping, by the processor, to another chapter in the storyboard.

The suite of customer apps includes marketing, intelligence, and eCommerce app that generate data about the customer during the ongoing customer interaction.

In various exemplary embodiments, the demo management system presents a demo display system that is a storyboard of a dialog of a customer interaction wherein the storyboard includes a set of webpage images mimicking webpage images presented to the customer and received by a user. The demo management system implements a non-transitory computer-readable medium configured to present the demo mimicking behavior of a suite of customer apps used in the dialog. The demo management system includes a processor configured to receive a link for the demo to enable the user to initiate the demo by a single tap; present the first set of webpage images with animation of the customer interaction to the customer, and present a second set of webpages with animation of the customer interaction containing mimicked data from the suite of customer apps that build on an ongoing customer interaction based on mimicked data received from the suite of customer apps during the ongoing customer interaction to enable the demo to have an appearance of actual customer interaction.

The demo management system includes a second non-transitory computer-readable medium configured to store a plurality of webpages in the dialog, and wherein the processor manages a mimicking of the dialog during the customer interaction based on a webpage that is selected from the plurality of dialog webpages, and is further configured to mimic a selection in the demo the dialog of the webpage from the plurality of webpages based on the customer interaction. The system is further configured to select the webpage and configure the webpage with animation that mimics the customer interaction in the demo from the plurality of webpages based on the suite of customer apps and to communicate customer information in the demo based on customer profile mimicked from a commerce app.

The system is further configured to mimic communications by way of at least one text message and email on the webpage presented to the customer in the demo and to recognize a tap action of the user from on the webpage to navigate to the next webpage in the storyboard during the demo. The system is configured to recognize a set of gestures by the user during the demo wherein the set of gestures enable by tap action at least a flip back and forth between the first and second set of webpages.

In various exemplary embodiments, a multi-tenant enterprise system including one or more processors and non-transient computer readable media coupled to the one or more processors, the non-transient computer-readable media embodying programming instructions configurable to perform a method of displaying, by a processor, a link for accessing a demo to a user; initiating, by the processor, the demo by a single tap actuation of the link by the user wherein the demo contains a set of webpage images, each configured as a screen with animations to mimic an interaction between the user and a customer; and presenting, by the processor, a storyboard of a dialog composed of a set of screens mimicking a customer interaction for a service wherein the set of screens contains a first set of webpage images of a customer view and a second set of webpage images of backend analytical views that are configured with animation to build on an ongoing customer interaction based on mimicked data received from a suite of customer apps to enable the demo have an appearance of an actual customer interaction.

Figure 5A:
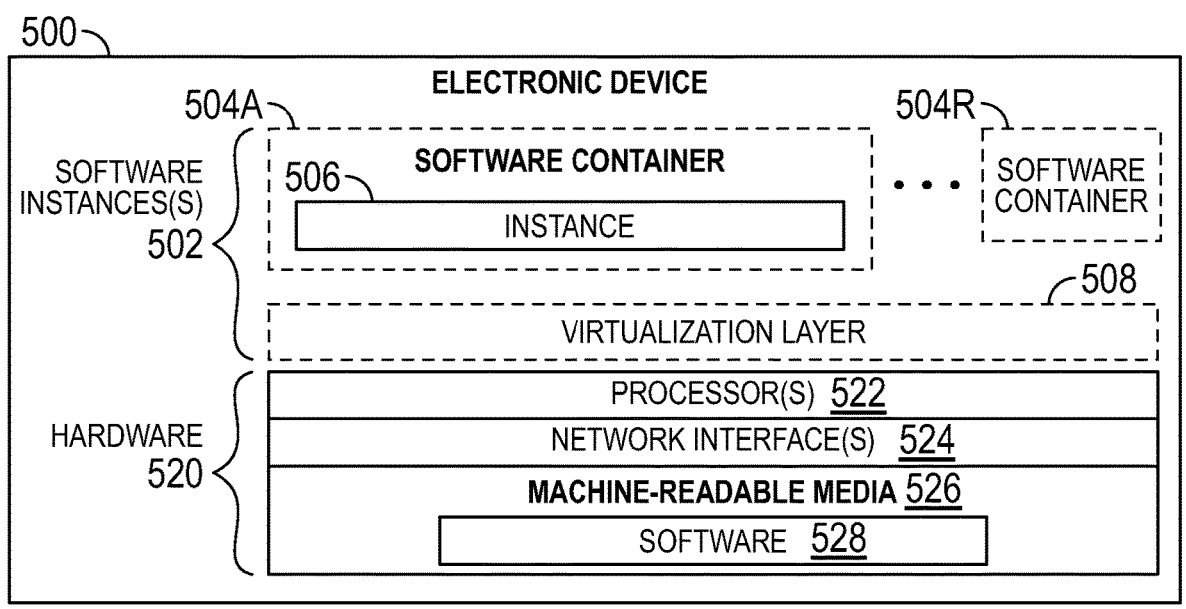
FIG. 5A is a block diagram illustrating an electronic device according to some example implementations.

FIG. 5A is a block diagram illustrating an electronic device 500 according to some example implementations. FIG. 5A includes hardware 520 contains a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the demo service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the demo management service and demo presenter (e.g., software 528 represents a web browser, a native client, a portal, a command-line interface, and/or an application programming interface (API) based upon protocols such as Simple Object Access Protocol (SOAP), Representational State Transfer (REST), etc.)); 2) the demo presenter and demo management service is implemented in a separate set of one or more of the electronic devices 500 (e.g., a set of one or more server devices where the software 528 represents the software to implement the demo presenter and demo management service); and 3) in operation, the electronic devices implementing the clients and the demo presenter and demo management service would be communicatively coupled (e.g., by a network) and would establish between them (or through one or more other layers and/or or other services) connections for submitting requests to the demo on tap service and returning mimicked requests to the clients. Other configurations of electronic devices may be used in other implementations (e.g., an implementation in which the client and the demo presenter and demo management service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-304R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-304R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute, virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R, if implemented, are collectively referred to as software instance(s) 502.

Alternative implementations of an electronic device may have numerous variations from that described above. For example, customized hardware and/or accelerators might also be used in an electronic device.

Example Environment

Figure 5B:
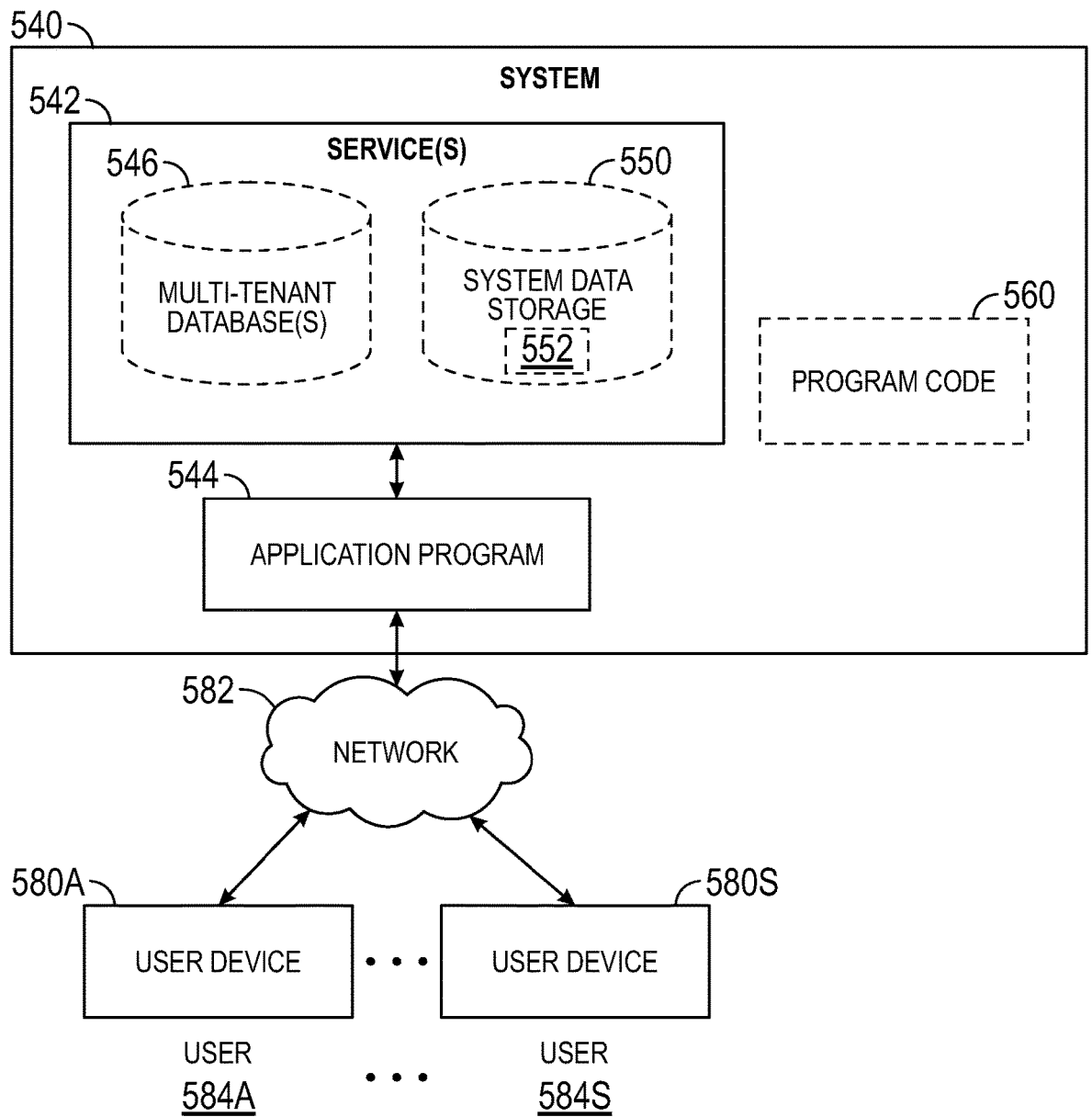
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the demo presenter and demo management service. In some implementations, the system 540 is in one or more data center(s). These datacenter(s) may be: 1) first-party datacenter(s), which are data center(s) owned and/or operated by the same entity that provides and/or operates some or all of the software that provides the service(s) 542; and/or 2) third-party datacenter(s), which are data center(s) owned and/or operated by one or more different entities than the entity that provides the service(s) 542 (e.g., the different entities may host some or all of the software provided and/or operated by the entity that provides the service(s) 542). For example, third-party data centers may be owned and/or operated by entities providing public cloud services (e.g., AMAZON.COM®, Inc. (AMAZON® Web Services), GOOGLE® LLC (GOOGLE® Cloud Platform), MICROSOFT® Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to as a multi-tenant system provider, operator, or vendor; or simply a provider, operator, or vendor) that provides one or more services to the tenants (in which case the tenants are customers of the operator and sometimes referred to as operator customers). A tenant includes a group of users who share common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant-specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data, and another set of tenants may be customers of different ones or all of the vendors' data. As another example, in the context of the platform as a Service (PAAS), one set of tenants may be third-party application developers providing applications/services, and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: Demo on tap; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on electronic server devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response, the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including 1) metadata that describes constructs (e.g., forms, reports, workflows, user access privileges, business logic) that are common to multiple tenants; and/or 2) metadata that is tenant-specific and describes tenant-specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the demo presenter and demo management service, maybe coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be anyone or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth-generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touchpad, a touch screen, a pen or the like, video or touch-free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from the server(s) of system 540, thus allowing users 584A-584S of the user devices 580A-580S to access, process and view information, pages, and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, cooperate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for presenting a demo to a customer, the method comprising:
    causing to display by a processor, a link for accessing the demo;
    initiating, by the processor, the demo by actuation of the link wherein the demo comprises a set of webpage images, each configured as a screen with animation to mimic an interaction between a user and the customer; and
    presenting, by the processor, a storyboard of a dialog composed of a set of screens mimicking an ongoing customer dialogue for a service wherein the set of screens comprises a first subset of webpage images of a customer view and a second subset of webpage images of a backend analytical view that are configured with animation based on the ongoing customer dialogue and mimicked data received from a suite of customer apps to enable the demo to have an appearance of actual customer exchange;
    in response to a tap action by the user of a flip icon configured on the screen, flipping, by the processor, between the first and second set of screens during the storyboard of the dialog; and
    in response to a tap action by the user elsewhere on the screen other than at the flip icon, advancing, by the processor, to a next screen in the storyboard.

2. The method of claim 1, further comprising:
    managing, by the processor, the dialog between the user and the customer based at least on a tap action to switch between the first and second set of screens.

3. The method of claim 1, further comprising:
    mimicking, by the processor, a set of behaviors of each customer app in the suite of customer apps by animation in a webpage displayed as the screen in the storyboard forming the dialog in the ongoing customer dialogue.

4. The method of claim 1, further comprising:
    configuring at least one webpage with animation in a bezel display of a mobile device in the demo when presenting the storyboard of the dialog.

5. The method of claim 1, further comprising:
    dividing, by the processor, the storyboard into chapters, and
    in response to a swipe action by the user on the screen, jumping, by the processor, to another chapter in the storyboard.

6. The method of claim 1, wherein the suite of customer apps comprises marketing, intelligence, and service apps that generate data about the customer during the ongoing customer dialogue.

7. A computer-implemented system to present a demo to a customer, the system comprising:
    a plurality of customer views that make up a storyboard for presentation in the demo wherein the demo comprises a sequence of webpage images that illustrate a dialog of a customer exchange of at least one or more informative responses to customer inquiry that are put together to form the storyboard of customer exchanges in an interactive session wherein the sequence of webpage images display mimicked data generated by a set of customer app that are used by an user to respond to each customer inquiry and presented to the customer;
    a non-transitory computer-readable medium configured to present the demo which mimics behavior of a suite of customer apps used in the dialog wherein the mimicked behavior comprises representations of the customer exchanges between a customer and agent; and
    a processor configured to:
        cause to display a link for the demo to enable the user to access the demo;
        cause to display a set of webpage images that comprise one or more displays containing animation that represent a customer exchange wherein the animation is prebuilt animation displayed by a demo presenter in the set of webpage images; and
        cause to display another set of webpages that comprise one or more displays containing animation of the customer exchange which contains mimicked data that is received from the suite of customer apps which are used to generate data in response to a customer inquiry during an ongoing customer dialogue wherein the mimicked data that is presented from the suite of customer apps during the ongoing customer exchange enables the demo to have an appearance of actual customer interaction because of a presentation of the demo containing data response to the customer inquiry wherein the suite of customer apps comprises marketing, intelligence, and service apps that generate data about the customer during the ongoing customer dialogue.

8. The system of claim 7, further comprising a second non-transitory computer-readable medium configured to store a plurality of webpages in the dialog, and wherein the processor manages a mimicking of the dialog during the ongoing customer exchange based on a webpage that is selected from a plurality of dialog webpages.

9. The system of claim 8, wherein the processor is further configured to mimic a selection in the demo of the dialog of the webpage from the plurality of webpages based on the customer exchange.

10. The system of claim 9, wherein the processor is further configured to select the webpage and configure the webpage with animation that mimics the ongoing customer dialogue in the demo from the plurality of webpages based on the suite of customer apps.

11. The system of claim 10, wherein the processor is further configured to communicate customer information in the demo based on customer profile mimicked from a service app.

12. The system of claim 11, wherein the processor is further configured to mimic communications by way of at least one of text messages and email on the webpage presented to the customer in the demo.

13. The system of claim 12, wherein the processor is configured to recognize a tap action of the user from on the webpage to navigate to a next webpage in the storyboard during the demo.

14. The system of claim 13, wherein the processor is configured to recognize a set of gestures by the user during the demo wherein the set of gestures enable by tap action at least a flip back and forth between the first and second subsets of webpages.

15. A multi-tenant enterprise system comprising one or more processors and non-transient computer-readable media coupled to the one or more processors, the non-transient computer-readable media embodying programming instructions configurable to perform a method, the method comprising:
  causing to display, by a processor, a link for accessing a demo;
  initiating, by the processor, the demo by actuation of the link wherein the demo comprises a set of webpage images, each configured as a screen with animation to mimic an interaction between a user and a customer; and
  causing to display by a processor, a link for accessing the demo;
  initiating, by the processor, the demo by actuation of the link wherein the demo comprises a set of webpage images, each configured as a screen with animations to mimic an interaction between a user and the customer; and
  presenting, by the processor, a storyboard of a dialog composed of a set of screens mimicking an ongoing customer dialogue for a service wherein the set of screens comprises a first subset of webpage images of a customer view and a second subset of webpage images of a backend analytical view that are configured with animation based on the ongoing customer dialogue and mimicked data received from a suite of customer apps to enable the demo to have an appearance of actual customer exchange wherein the suite of customer apps comprises marketing, intelligence, and service apps that generate data about the customer during the ongoing customer dialogue.

16. The system of claim 15, further comprising:
the processor is configured to manage the dialog between the user and the customer based at least on a tap action to switch between the first and second set of screens.

17. The system of claim 16, further comprising:
the processor is configured to mimic a set of behaviors of each customer app in the suite of customer apps by animation in a webpage displayed as a screen in the storyboard, that forms the dialog in the ongoing customer dialogue.

18. The system of claim 17, further comprising:
the processor is configured to present at least one webpage with animation in a bezel display of a mobile device in the demo when the storyboard of the dialog is presented.

* * * * *